Aug. 3, 1965  R. E. COLONIUS ETAL  3,198,080
TANDEM HEAD PROFILER
Filed Nov. 15, 1963  4 Sheets-Sheet 1

INVENTORS:
RAY E. COLONIUS
CHARLES R. ONSRUD
BY
ATT'YS

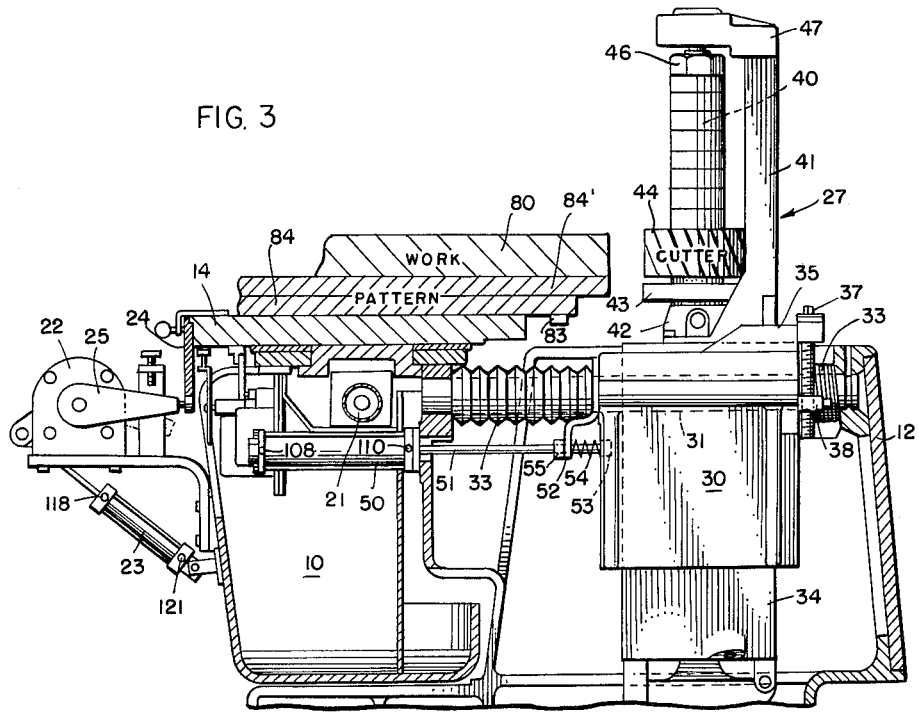
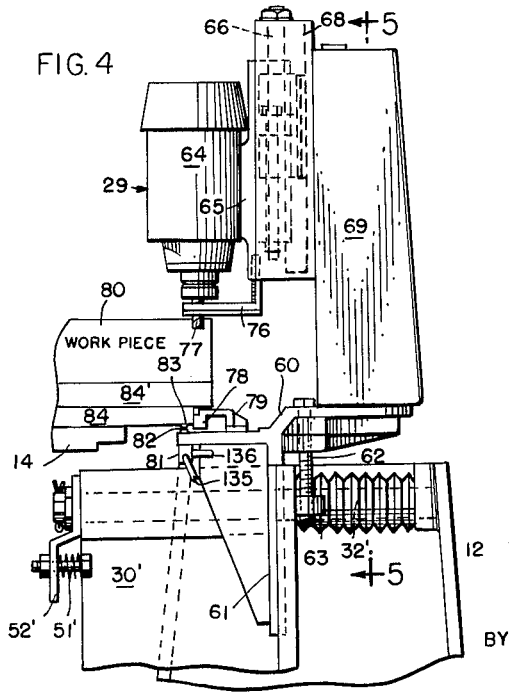
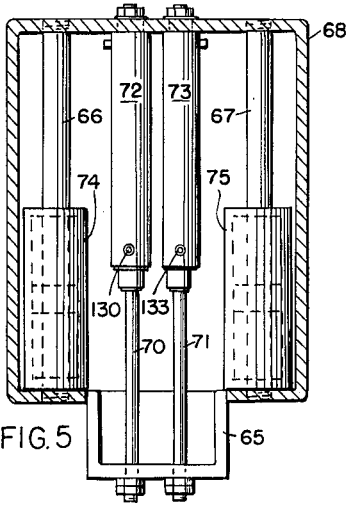
FIG. 3
FIG. 4
FIG. 5
INVENTORS:
RAY E. COLONIUS
CHARLES R. ONSRUD
ATT'YS

INVENTORS:
RAY E. COLONIUS
CHARLES R. ONSRUD
ATT'YS

Aug. 3, 1965   R. E. COLONIUS ETAL   3,198,080
TANDEM HEAD PROFILER
Filed Nov. 15, 1963   4 Sheets-Sheet 4

INVENTORS:
RAY E. COLONIUS
CHARLES R. ONSRUD
BY
ATT'YS

United States Patent Office 3,198,080
Patented Aug. 3, 1965

3,198,080
TANDEM HEAD PROFILER
Ray E. Colonius, Palatine, and Charles R. Onsrud, Chicago, Ill., assignors to Onsrud Machine Works, Inc., Niles, Ill., a corporation of Illinois
Filed Nov. 15, 1963, Ser. No. 323,933
11 Claims. (Cl. 90—13.5)

This invention relates to woodworking machines for contouring and profiling operations and particularly concerns improvements in such machines wherein the workpiece is clamped with the pattern on a reciprocating work table which is moved past the cutters on a controlled speed working or shaping stroke and then rapidly returned to the loading position for removal of the finished workpiece and mounting of another blank to be shaped.

Specifically this invention concerns improvements in the profiling machine shown and described in our co-pending application, Serial No. 46,820, filed August 1, 1960, now Patent No. 3,119,306, and the main objects of this invention are to increase the versatility of the profiling machine whereby, in a single stroke of work table movement, a finished workpiece requiring different kinds of cutting operations can be produced; to provide such a profiling machine whereby two different designs can be cut in the workpiece during one pass of the work table; to provide such a machine which will perform both face shaping and edge cutting on a workpiece during a single pass of the work table; to provide such a machine whereby a three-dimensional routing operation can be performed during a single pass of the work table; and to provide an improved reciprocating-table profiler whereby both face or edge shaping and three-dimentional edge routing can be done automatically on the workpiece during a single pass of the work table.

A specific embodiment of this invention is shown in the accompanying drawings in which:

FIG. 3 is a vertical sectional view of the cutter unit, as taken on the plane of line 3—3 of FIG. 2, but showing a cutter carriage in retracted or inoperative position and illustrating the manner by which it is mounted and operated.

FIG. 4 is a side elevation of a router mount for the cutter unit of our improved profiler, showing the router in operative position relative to a pattern.

FIG. 5 is a rear elevational view of the same, as taken on line 5—5 of FIG. 4, showing the arrangement for raising and lowering the cutter unit relative to the workpiece.

Figures 1, 2:
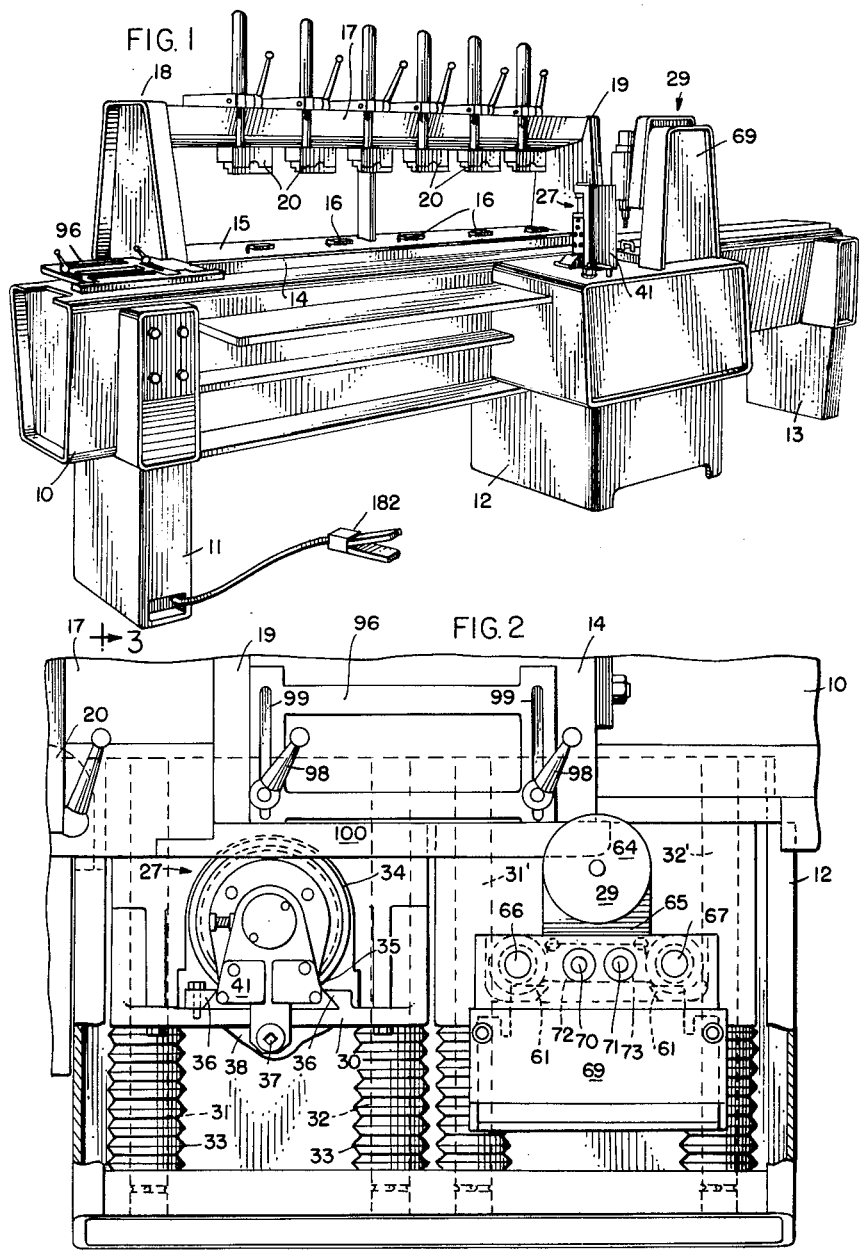
FIGURE 1 is a perspective view showing the improved profiler embodying our invention.
FIG. 2 is a plan view of the tandem cutter unit of the improved machine, the cutters being shown in a forward or operating position.

As shown in FIG. 1 of the drawings the profiling machine in which our invention is embodied is similar to that shown and described in our before mentioned co-pending application and comprises a horizontally disposed, elongate frame 10 which is supported on pedestals 11, 12 and 13 and which mounts a workpiece carrier 14 slidable lengthwise of the frame 10 in appropriate slideways. The intermediate pedestal 12, located substantially midway of the length of the frame 10, is a hollow box-like structure which houses and supports the improved cutter mechanism of our invention and the workpiece carrier 14 is adapted to transport the workpiece to be shaped past the cutter mechanism, in the left to right direction as viewed in FIG. 1, for the cutting operations and then back to the starting position for removal of the finished piece and its replacement by another blank piece to be worked.

As shown, the workpiece carrier 14 has a flat bed portion 15 on which a plurality of pattern clamps 16 are mounted for securing a cutter positioning and control template, to be engaged by follower means on the respective cutter assemblies; and spaced above the bed portion 15 is a longitudinally extending bridge 17, carried by end supports 18 and 19 rising from the bed portion, on which vertically adjustable work clamps 20 are mounted for holding the workpiece on the template or pattern in position to be engaged by the cutters. The carrier 14 may be reciprocated at controlled and varied speeds by any suitable drive means, not shown, and it will be understood that the cutting operation will be completed during one pass of the carrier and that at the end of the return stroke the carrier will automatically stop for removal of the finished workpiece and reloading with a new workpiece blank.

In the machine shown, the work table drive is by reversible hydraulic means, indicated at 21 in FIG. 3, and table operation controlled by a valve means 22 which is operated, for forward and reverse table movement, by a pneumatic cylinder and piston actuator 23 as will be hereafter described. The valve means 22 also functions as a speed control means for the table movement and is operable by a clamp 24, fixed to the work table, acting against a valve operating lever arm 25 which is normally urged into engagement with the cam 24 by the pneumatic means 23.

As shown in FIGS. 1 and 2 the cutter unit, which is mounted in the pedestal 12, comprises a pair of independent cutting devices each including a carriage which, in turn, is supported on bearing rods or shafts for reciprocable movement toward and away from the path of the work table 14. The cutting device 27 is adapted for two-dimensional face or edge shaping and the cutting device 29 is movable vertically, as well as toward and away from the path of the work table, for three di-mensional cutting operations.

The carriage 30 for the cutting device 27, as shown in

FIGS. 2 and 3, is mounted on horizontally spaced slide rods 31 and 32 housed within the hollow pedestal 12 and disposed normal to the path of movement of the carrier 14, the carriage 30 being supported on suitable bushings for easy reciprocable movement on the slide rods and each of the slide rods being enclosed in bellows type covers 33, at each end of the carriage, to keep them clean of cuttings generated from the work. The cutting device 27, itself, comprises a motor 34 mounted vertically on a slide 35 which in turn is mounted in dovetail slideways 36 on the inner face of the rear wall of the carriage. The slide 35 is vertically positioned in the slideways 36 by means of an adjusting screw 37 rotatably fixed on the slide 35 and threadedly engaged in a rearward projecting lug or bracket 38 integral on the carriage 30.

The shaft of the motor 34 is drivingly coupled with a spindle 40 rotatably mounted in an arbor 41, which in turn is bolted onto the upper end of the housing of the motor 34. As shown, the coupling end 42 of the arbor 41 includes a freely rotatable follower 43, concentric with the spindle axis, above which the cutter 44 is mounted fast to the spindle. Preferably the spindle is long enough to carry the longest cutter likely to be used and, when shorter cutters are employed, spacers 45 are mounted on the spindle between the cutter and the cutter clamping nut 46 threaded onto the spindle at its upper end. The upper end of the spindle 40 is journaled in a removable arbor cap 47 and is thus supported against lateral deflection.

The carriage 30 is moved forward and back on the rods 31 by means of a pneumatic cylinder and piston unit 50, mounted in the body or frame 10 and connected to the carriage 30 by means of a piston rod 51 which extends slidably through a bracket 52 attached to the inner end of the carriage. As shown, the piston rod 51 terminates in a head 53, spaced inwardly of the bracket, and a helical spring 54 is disposed on the piston rod between the bracket 52 and the head 53. A collar 55 secured fast on the piston rod 51, outwardly of the bracket 52, bears against the bracket to provide positive thrust in the rearward direction.

As shown in FIGS. 2 and 4 the cutter element 29 comprises a base member 60 adapted to be slidably mounted in vertical ways 61 on the inner or forward side of the end plate of a carriage 30', which in turn is mounted on slide rods 31' and 32' within the pedestal housing 12 in the same manner as the carriage 30 shown in FIG. 3. The base member 60 is also provided with an adjusting screw 62 which is threadedly engaged in a lug 63 projecting rearwardly from the carriage 30'. The cutter motor 64 is disposed vertically and is rigidly mounted on a slide 65, which in turn is slidably supported upon a pair of vertical slide rods 66 and 67, fixedly mounted in a box-like housing 68 which is an integral part of a rectangular column 69 secured on the upper end of the base member 60. As shown in FIG. 5 this slide member 65 is hung in the housing 68 on a pair of piston rods 70 and 71 extending from respective cylinders 72 and 73 attached to and depending from the top wall of the housing 68. Preferably the slide 65 includes antifriction bushings 74 and 75 through which the rods 66 and 67 extend.

As shown in FIG. 4, a vertically adjustable shoe 76 extends forwardly from the slide 65. The cutter 77, driven by the motor 64, projects downwardly through the shoe 76 and the extent of projection of the cutter 77 below the bottom of the shoe is determined by vertical adjustment of the shoe. Also, a follower roller 78 is mounted on the base member 60 in axial alignment with the cutter 77, and is supported at its upper end by a bracket 79.

At this point it should be understood that the carriage 30' for the cutter means 29 is actuated toward and away from the work table 15 by a pneumatic cylinder arrangement such as that shown in FIG. 3 for the carriage 30.

As shown in FIG. 4, the carriage 30' is slidably actuated on its support rods by means of the piston rod 51', acting on the bracket 52' which in turn is secured to the forward end of the carriage 30'. Thus, upon forward movement of the carriage 30', the guide roller 78 is brought into engagement with the appropriate pattern, mounted on the work table or carriage 15, as will be hereafter described. Also, as shown in FIG. 5, the cylinder 72 functions as a means for raising and lowering the motor slide 65 and the cylinder 73 functions as a means for providing a counterbalance for the weight of the cutter motor and the slide when the cylinder 72 is inoperative and the cutter motor and slide are urged gravitationally in the downward direction with the shoe 76 riding on the upper surface of the workpiece 80.

As shown in FIG. 4, a normally closed flow-valve 81 is mounted at the forward end of the base member 60 and is arranged to be actuated to open position by a button 82 which projects above the upper surface of the base member 60, the button 82 being disposed forwardly of the follower 78 in position to be engaged by a cam or rail 83 projecting downwardly from the bottom side of the pattern 84 (see FIG. 3). The function of the valve 81 is to cause the power cylinder 72 to lift or retract the motor 64, and hence withdraw the cutter 77 from the workpiece 80, whenever the button 82 is depressed by engagement with the cam member 83.

Figure 6:
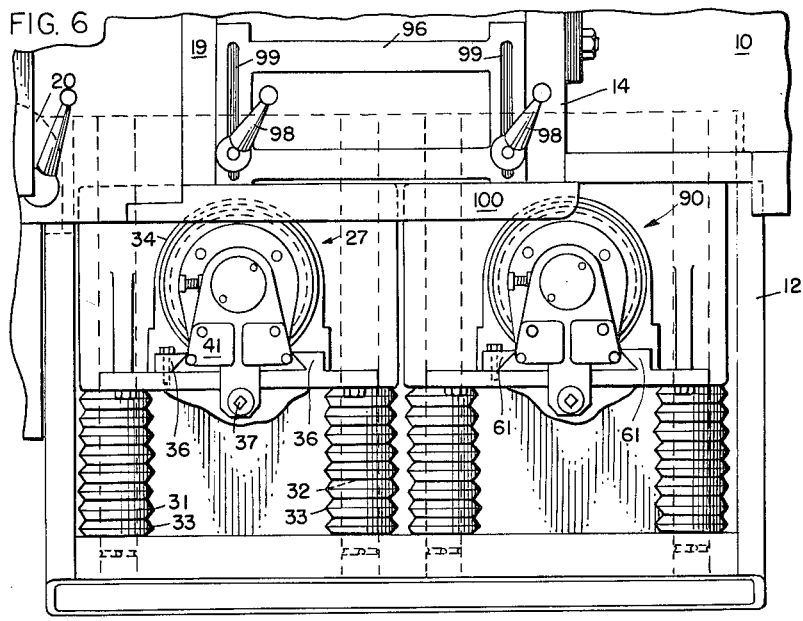
FIG. 6 is a plan view of the tandem cutter unit like that of FIG. 2, but showing a pair of face or edge cutters on the dual cutter carriages.

In the arrangement shown in FIG. 6, the second cutting means 90 is a duplicate of the first cutting means 27 in so far as structure is concerned. In this arrangement, however, the motor for the second cutting means is a reversible motor and the cutter spindle will mount a different kind of cutter than that employed in the cutter means 27. Thus, with the arrangement of FIG. 6, several different kinds of shaping operations, each of which requires the successive use of at least two different cutters, may be performed, the two different cutting operations being accomplished in the course of a single pass of the workpiece and pattern past the cutter unit.

Figure 7:
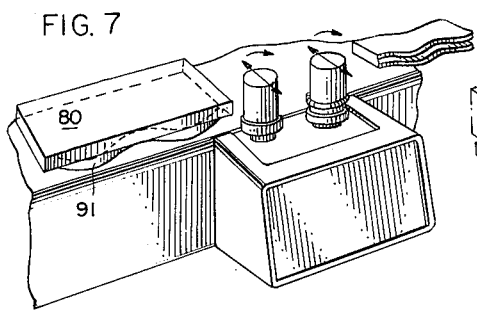
FIG. 7 is a schematic view illustrating an edge profiling operation performed by our improved machine.

Thus, as shown in FIG. 7, the workpiece 80 together with a single profile pattern 91 are moved past the tandem head cutter unit wherein the first head is provided with a rough cutter for a rough shaping operation and the second head is provided with a finish cutter for final shaping of the workpiece. In this case both cutters perform a climb cutting operation and thus rotate in the same direction.

Figure 8:
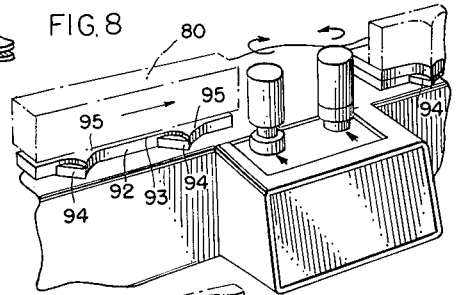
FIG. 8 is a similar view illustrating a reverse rotation cutting operation for sharp angle face contouring.

FIG. 8 illustrates a reverse rotation cutting operation by the tandem heads of the cutter unit. In this case the first head performs a climb cutting operation and the second head performs a conventional cutting operation. Thus, the work can be conventionally cut when the cutter is falling into the work and can be climb-cut when the cutter is pulling out of the work, and by staggering the shaping operations in this manner it is possible to operate at much higher feed speeds without any tear-out from the workpiece. As indicated in FIG. 8, the pattern, in this case, is made with two levels 92–93, the first cutter follower engaging pattern 92 and the second cutter follower engaging the upper level pattern 93. The cutting areas are controlled by masking the pattern, as at 94 and 95, whereby the respective followers will cause their cutters to do only the kind of cutting operation for which the cutters are designed.

Figure 9:
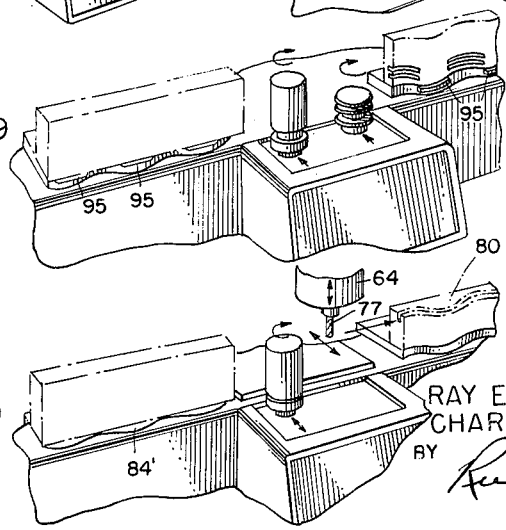
FIG. 9 is a similar view illustrating a combination primary and secondary design cutting operation of the improved machine.

FIG. 9 illustrates still another kind of shaping operation that can be done with the tandem head arrangement of FIG. 6. In this case, by using contoured cutters, two different designs can be cut in the workpiece during a single pass. There the first cutter is a face contour cutter for contour shaping the face of the workpiece, and the second cutter is a grooving cutter. In this case the upper level of the pattern is masked, as at 95, for all those areas where the grooving cutter is desired to be disengaged from the work.

Figure 10:
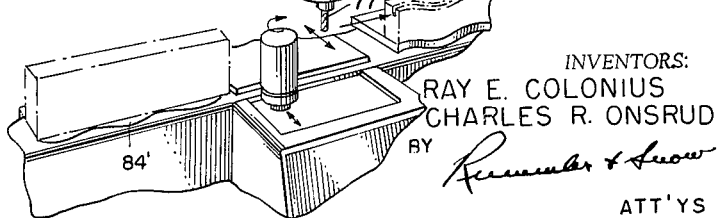
FIG. 10 is a similar view illustrating a combination face or edge contouring and three-dimensional routing operation.

FIG. 10 illustrates diagrammatically the combination shaping and routing operation that can be performed by the units shown in FIGS. 3 and 4 when they are employed in tandem. In this case the motor 64 and hence the cutter 77, is free to move in, out, up, and down, thus permitting automatic routing of piece parts while they are being shaped by the first cutter. In this arrangement the routing cutter 77 can also be used to edge-cut so that smaller and tighter curves can be shaped than would be possible with conventional shaping machines. In a routing operation, however, the three-elevel pattern illustrated in FIGS. 3 and 4 would be employed. Thus, for a combination shaping and routing operation, the fillower 43 of the first cutting means (see FIG. 3) would engage the upper level 84' of the pattern for a face or edge shaping operation, following which the guide roller 78 of the secondary cutting means, shown in FIG. 4, by engagement with the lower pattern level 84, would lead the cutter 77 into the upper surface of the workpiece 80. In this case the downwardly projecting cam-rail 83, or third pattern level, will be employed to cause retraction of the cutter 77 from the workpiece at any time that a routing operation on the workpiece is not desired.

In the normal operation of our improved tandem head profiler machine, each of the cutting means is normally urged toward the work table or carrier by means of the respective cylinders 50 and 50' (see FIG. 11) when an operating cycle is about to be initiated. Therefore, in order to provide for smooth engagement of the respective cutter followers with the template, the work table or carriage 14 is provided with an adjustable starting block 96 at its leading end, as illustrated in FIGS. 2 and 6, and a run-off block 96' at the trailing end as shown in FIG. 1. The starting block 96 and run-off block 96' are identical in form, and each is clamped to the workpiece carrier 14 by means of clamps 98 which are threaded on appropriate studs extending through slot-ways 99. Also, each block includes a cam engaging rail 100 positioned to serve as a continuation of the pattern or template beyond the table end member 19. Thus, when the work table 14 is at its starting position, the cam rail 100 of the starter block 96 will be engaged by the followers of the two cutting means 27 and 29. Similarly, when the work carrier 14 reaches the end of an operating stroke wherein the second cutter means 29 has completed its operation, the run-off block 96' will be engaged by the respective followers until the cutting means are retracted for the return movement of the work carrier 14 to its initial or starting position.

In the operation of the improved tandem head profiler machine the first step is to fasten the work template to the work table or carrier 14 by means of the template clamps 16. When this is done the tandem cutter means 27 and 29 are caused to retract from the work table 14 and the work table is then operated through a complete cycle of forward and return motion to make sure that the work clamps do not project into the path of the cutter means. Then the cutter means are actuated toward the work table 14, so as to bring their respective followers into engagement against the starter block 96 and, with the power to the cutter motors cut off and without work on the template, the work table is caused to go through one complete cycle to check follower movement against the template profile and to check the setting of the table reversing switch. During this check operation, an appropriate speed control template (see FIG. 3) having been mounted, a check of the desired table speed throughout an entire cycle is made.

Once the operation of the work table 14 has been initiated, the full operating cycle will be completed automatically. At the end of the cycle the table movement will be stopped at the initial or loading and unloading position shown in FIG. 1. Thereafter each cycle of operation must be manually initiated, and for this purpose a foot switch is provided as indicated in FIG. 1. In the preferred embodiment of our improved profiler machine all operations, except for the electric motors driving the cutters and the hydraulic pump unit, are pneumatically actuated and the pneumatic system will now be described.

Figures 11, 12:
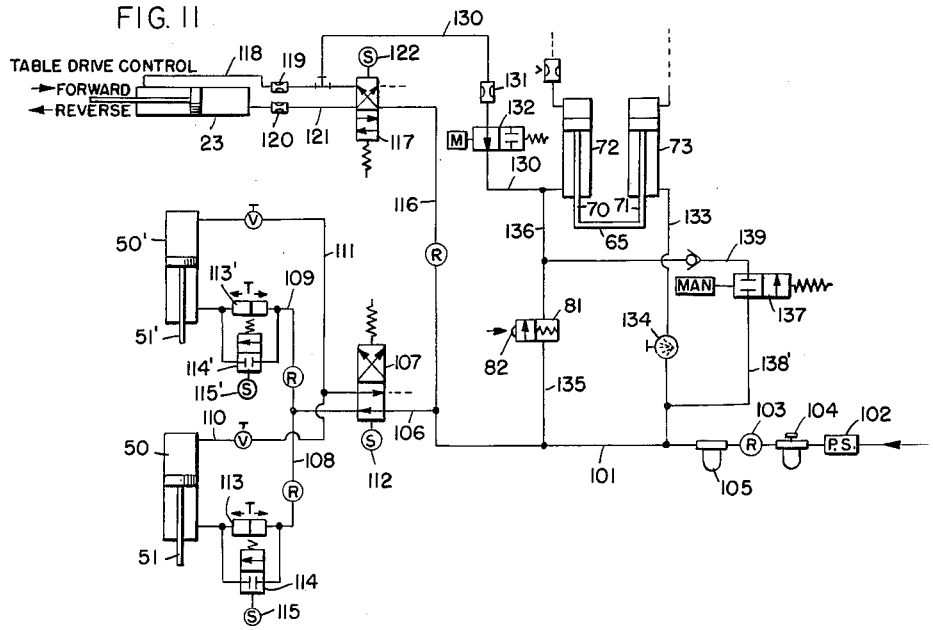
FIG. 11 is a diagrammatic illustration of a pneumatic control system for operation of the cutter unit.
FIG. 12 is an electric circuit diagram illustrating a control system for operation of the improved profiling machine.

Referring now to FIG. 11, which illustrates the pneumatic portion of the control system, it will be seen that compressed air, from a suitable source not shown, is supplied to the main 101 through a pressure switch 102, a pressure regulator 103, and filter means 104–105. From the main 101, a branch 106 leads to a four-way, solenoid actuated, spring returned valve 107, which is connected to normally supply fluid pressure to the piston-rod end of each of the two cutter-carriage actuating cylinders 50 and 50' by way of branch conduits 108 and 109 respectively. The opposite end of each cylinder 50 and 50' is normally bled to atmosphere, through the valve 107, by way of conduits 110 and 111, each of which includes a suitable adjustable throttling valve. Thus, when the valve 107 is in its normal position, under the influence of its return spring, air pressure is applied to each of the cylinders 50 and 51 to urge the respective cutter-carriages 30–30' toward the work table 14; and when the valve 107 is actuated by its solenoid 112 the air flow is reversed, the air pressure is directed to the opposite ends of the cylinders 50–50', through the conduits 110 and 111, and the cutter-carriages are urged to a retracted position.

As shown each of the pressure supply conduits 108 and 109 includes an adjustable two-way flow control valve, 113 and 113' respectively, for governing the speed of the respective carriage during movement toward and away from the work table so as not to slam the cutters into the work or to slam the carriages into the back wall of the housing at the end of a retraction stroke. These flow control valves are conventional devices and are usually arranged for separate adjustment of the flow rate in each direction. Also, since it is desirable to apply full pressure to the piston rod ends of the cylinders 50 and 50' during a shaping operation on a workpiece, a by-pass is provided around each of the speed control valves 113–113' and each by-pass is controlled by a normally closed valve 114–114' actuated by the respective solenoids 115–115'. As will be hereafter explained, the solenoids 115–115' are actuated simultaneously and during a working stroke only of the work table 14. Thus, at all other times the air flow in the lines 108 and 109 is under control of the respective speed control valves 113–113'.

As shown in FIG. 11, a second branch conduit 116 leads from the main 101 to the control cylinder 23 which actuates the table-forward drive speed control and reversing means 22 (see FIG. 3). This conduit connects with a solenoid actuated, spring returned, valve 117 which normally directs fluid pressure to the piston retracting end of the cylinder 23 through conduit 118 and adjustable flow control 119, the opposite or driving end of the cylinder 23 being bled to atmosphere through speed control 120 and conduit 121, as shown. The valve 117 is a flow reversing valve and, when operated by its solenoid 122, directs the fluid pressure to the conduit 121 and the driving end of the cylinder 23, thus causing operation of the table drive means in the forward, or working stroke direction. Upon de-energization of the solenoid 122 the valve 117 is returned to its normal position by its spring and the cylinder 23 is actuated in the retracting direction causing automatic reversal of the table movement. This occurs at the end of the working stroke of the table 14 and returns the table to its starting and loading position shown in FIG. 1.

With the cutter unit arrangement as shown in FIGS. 1, 2, 4 and 5 a branch conduit 130 is led from the conduit 118 to the lower or piston rod end of the retraction cylinder 72 through a speed control valve 131 and a normally open manually closed valve 132. Thus, under normal, de-energized, condition of solenoid 122 and valve 117, the line pressure is applied to lift the piston rod 70 of the cylinder 72 and retract the motor slide 65 to lift the cutter 77 from work engaging position; and when the solenoid 122 is energized the line 130 is opened to atmosphere and the motor slide 65 is free to drop under the force of gravity. This last condition, however, is checked by the balance cylinder 73 which is continuously pressured, on the slide lifting side, by a conduit 133 leading from the main line 101 through an adjustable pressure regulator 134. The regulator 134 is of the kind having automatic pressure relief on the delivery side so that the pressure in the delivery line 133 is constant at all times that pressure is on the main supply line 101. The purpose is to provide pressure on the lifting side of the balance cylinder 73 sufficient to almost, but not quite, balance the weight of the motor and slide assembly 64-65 so that, when the pressure is off the retraction cylinder 72, the weight of the cutter assembly bearing on the work, through the shoe 76, will be minimal and the cutter assembly will be substantially floating.

The pattern actuated means for effecting work engagement and retraction operation of the cutter assembly, as shown in FIG. 4, comprises the normally closed two way valve 81 connected between the main 101 and the lifting side of the retraction cylinder 72 by conduits 135-136. This valve 81 is spring closed and is opened by depression of the operating button 82 by means of the rail 83 on the bottom side of the pattern to cause retraction of the cutter assembly 64-65-76-77.

Also, as shown in FIG. 11 means are provided for manually pressurizing the retraction cylinder 72, as may be desired during set-up or cutter replacing operations. This manual means comprises a normally closed valve 137 connected between the main 101 and the cylinder 72 by way of conduits 138-139.

The electrical portion of the control system for the herein described profiling machine is illustrated by FIG. 12 wherein the leads 150-151 represent a suitable source of electrical energy. Across the line is a lead 152 which serially connects the pressure switch 102, start and stop switches 153-154, a relay coil 155, and overload circuit breakers 156. The relay coil 155 operates a magnetic starter switch 157 containing the line switching contacts for a hydraulic pump motor 158 and the holding switch 159 for the relay coil 155. A fan motor 160 is connected in parallel with the relay coil 155, in series with the holding switch 159, and similarly connected is the lead 161 for the profiler machine operating circuits.

As shown, the lead 161 is in the nature of a bus which connects an emergency stop switch in series with a plurality of parallel branch circuits which operate the cutter motors and control the operating cycle of the work table 14 and the cutter carriages of the cutting unit, these branch circuits all connecting with the main lead 151. The first of these secondary circuits comprises a lead 162 to one side 163 a two pole, double throw switch 164, the said one side connecting parallel circuits 165 and 166, each of which controls a respective one of the cutter motors. Thus circuit 165 connects a start button 167, in series with a relay coil 168 and an overload circuit breaker 169, the relay coil, when energized, serving to operate a relay which closes the contacts of a holding switch 170 and the control means 171 of the first cutter motor. Similarly the circuit 166 connects a starter switch 172 in series with the relay coil 173 and an overload protection device 174, the relay coil 173, when energized, operating a relay which includes the contacts 175 of a holding circuit and the control means 176 of the second cutter motor. The push-button start switches 167 and 172 are intended to permit individual operation of the respective cutter motors as the machine operator may desire.

The next of these secondary circuits is for controlling the forward and then reverse operation of the work table 14, and comprises a lead 180 from the bus 161 which connects, through the other side 181 of the double throw switch 164, to one side of a normally open foot switch 182. The other side of the foot switch 182 connects with the normally open contacts 183 of a double throw microswitch 184 and thence, in series, through a normally closed micro-switch 185 and a relay coil 186 to the main line 151.

The function of the double throw switch 164 is to permit operation of the work table 14 and in and out movement of the cutter motor carriages, through a complete forward and reverse cycle, without operation of the cutter motors during the initial set up of the patterns and work clamps. In that case the switch 164 would be shifted from the normal "run" position shown, where the contacts 163 are closed and the contacts 181 open, to a "set-up" position in which the contacts 163 are open, to inactivate the motor circuits 165 and 166, and the contacts 181 are closed to activate the table drive circuit 180. The normal operating position of the switch 164, however, is as shown in FIG. 12.

The purpose of the foot switch 182 is to start the work table 14 on its forward movement in a normal cycle of operation. The start is always from the load position and once started the operation continues automatically until the work table has returned to its initial or load position where it automatically stops. The double throw switch 183 is mounted on the table frame 10 in position to be actuated closed by the work table as the table returns to the start or load position and the switch 185 is mounted on the frame 10 in a position to be actuated open when he work table 14 reaches the end of its forward or working stroke.

Since the contacts 181, in the table drive circuit 180, are held in open position when the switch 164 is set to a "run" position for normal operation of the machine, two bridge circuits 187 and 188 are arranged to energize the table drive circuit and each contains a switch actuated to closed position by a respective one of the cutter motor circuit relays when it is energized. Thus, as shown in FIG. 12 the bridge circuit 187 is closed by the relay coil 168 in the first cutter control circuit 165 and bridge circuit 188 is closed by relay coil 173 in the second cutter circuit 166. The bridge circuits are in parallel with each other so as to actuate the table drive circuit when either one or both of the cutter motors operates.

The relay coil 186 serves to operate a double throw switch 189 having normally open switch contacts 190 in a shunt lead 191 which bridges the normally open switches 182 and 183 to energize the solenoid 122 of the table drive control valve 117 (see FIG. 11) after forward motion of the work table has been started. The switch 189 also includes normally closed contacts 192 in a circuit 193 from the main line lead 150 to the solenoid 112 for operating the reversing valve 107 to cause retraction of the cutter carriages. This circuit 193 to the solenoid 112 is also controlled by the normally closed contacts 194 in the micro-switch 184 operated by the work table at its load position.

As before explained, the by-pass valves 114 and 114' (FIG. 11) are operated to open position, by their respective solenoids 115 and 115', whenever the cutters are in operation and the work table 14 is in a working or forward stroke. Thus, since these solenoids are to be operated only when the table drive control solenoid 122 is energized, the solenoids 115 and 115' are connected in parallel with the solenoid 122, to be actuated simultaneously therewith as shown in FIG. 12.

It will now be apparent that in the operation of the work table 14 all action will begin with the work table in the load position of FIG. 1. At this condition the switch 184 will be actuated to close contacts 183 and open contacts 194. Also, contacts 190 of switch 189 will be open, since relay coil 186 is de-energized, and contacts 192 will be closed. Thus, the solenoid 112 will be de-energized and the control valve 107 for the cutter carriages will be in its normal position to operate the cylinders 50 and 50' to urge the cutters toward the work table.

When the workpiece has been mounted on the pattern and clamped, the operator will momentarily step on the foot control valve 182 and initiate a cycle of table operation by activating solenoid 122 and relay coil 186, the circuit to solenoid 122 being held closed by switch 190 in the shunt connection 191. The work table will continue on its work stroke past the cutters, which are now urged toward the work table, until the table reaches the end of its forward stroke and opens the micro-switch 185. This de-energizes the relay coil 186 which then operates the switch 189 to open contacts 190 and close contacts 192, thereby energizing the solenoid 112 to operate the reversing valve 107 and cause the cutter carriages to retract. Opening contacts 190 will also de-energize the solenoid 122, since switches 182 and 183 are open, and cause reversal of the table drive control means 23 and the table will now be driven back to its starting position. Upon reaching the starting or load position the table will actuate the switch 184 to close contacts 183 and open contacts 194. This will de-energize the cutter retract valve solenoid 112, allowing the valve 107 to return to normal position and cause cylinders 50–50' to urge the cutters toward the work table. Also this will condition the control system for reactivation, by another momentary closing of the foot switch, when the operator has reloaded the work table with another workpiece to be shaped.

The main advantages of this invention reside in the fact that different cutting and shaping operations on a given workpiece can be accomplished in a single pass of the workpiece past the cutting unit; in the fact that by means of a compound template or pattern both two-dimensional and three-dimensional shaping or cutting operations can be performed on the workpiece during a single pass of the workpiece past the cutter unit; in the greatly increased speed and efficiency of production obtained by the improved machine; and in the relatively simple construction and operation of the machine whereby the cost of the machine and its operation is considerably less than that of prior apparatus and procedures for a comparable work output.

Although but one principal embodiment of this invention has been herein shown and described it will be understood that numerous details of the construction shown may be altered or omitted without departing from the spirit of the invention as defined by the following claims.

We claim:

1. A profiling machine comprising,
   (a) a work table mounted for horizontal reciprocation past a stationary cutter unit located at one side of said work table and adapted to carry a profile pattern and a workpiece to be countour shaped by said cutter unit,
   (b) said cutter unit comprising first and second cutter carriages each mounted for independent horizontal reciprocation toward and away from said work table,
   (c) reversible means for each of said carriages operable to urge the carriages resiliently toward the work table during its travel in one direction and to retract said carriages from the work table during its travel in the opposite direction,
   (d) a vertical axis motor driven spindle on each of said carriages and a cutter on each of said spindles,
   (e) a pattern follower on each of said carriages coaxial with the respective spindle,
   (f) means for adjusting the height of each said followers relative to the respective carriage and said work table and independently of the respective cutter,
   (g) means for driving said table through a forward work stroke past said cutter unit and automatically returning the table to its starting position, and
   (h) a pattern on said work table engageable edgewise by said followers for positioning said cutters individually relative to the profile of said pattern when the respective carriages are urged toward the work table by said reversible means.

2. A profiling machine according to claim 1 wherein said cutter carriages are automatically retracted from the table by said reversible means when said table reaches the end of its work stroke and are held in retracted position during return of the table to its starting position.

3. A profiling machine according to claim 1 wherein the spindle on the second cutter carriage is contained in a router head mounted on said second carriage for reciprocable movement vertically relative thereto and independently of the respective pattern follower.

4. A profiling machine according to claim 1 wherein the spindle on the second cutter carriage is disposed in a router head mounted on said second carriage for reciprocable vertical movement relative thereto, and power means are provided for raising said router head a predetermined maximum distance automatically when the work table reaches the end of a work stroke and holding said router head in raised position during return of the work table to its starting position.

5. A profiling machine according to claim 3 wherein the router head is freely slidable in vertical ways mounted on the second carriage, and wherein resilient means are provided to substantially counterbalance the weight of said router head.

6. A profiling machine according to claim 3 wherein the router head is freely slidable in vertical ways mounted on the second carriage, resilient means are provided to substantially counterbalance the weight of said router head, and power means are provided for operation to raise said router head a predetermined maximum distance when the work table reaches the end of a work stroke and to hold said router head in raised position while said work table returns to its start position.

7. A profiling machine according to claim 4 wherein control means are also provided for operating the power means to raise and lower the router head during a work stroke of the work table.

8. A profiling machine according to claim 7 wherein the said control means is mounted on the second cutter carriage forwardly of the corresponding follower in position to underlie the bottom margin of the pattern profile, and the pattern is provided with means on its bottom surface for actuating said control means.

9. In a profiling machine comprising a work table for moving a workpiece horizontally past a cutter unit having a cutter carriage movable toward and away from the work table in a direction normal to the travel thereof, a cutter rotatable on a vertical axis mounted on said carriage, a pattern follower on said carriage concentric with said cutter, means for driving said cutter, and reversible motor means operable to urge said cutter carriage resiliently toward said work table and to move said carriage retractively away from the work table, the combination of
   (a) a second cutter carriage mounted parallel with the first mentioned carriage and on the same side of the work table,
   (b) an axially vertical motor driven cutter and spindle assembly comprising a router head mounted on said second carriage for automatic vertical adjustment relative thereto,
   (c) a pattern follower on said second carriage,
   (d) a second reversible motor means for moving said second carriage toward and away from said work table independently of the first mentioned carriage, and
   (e) a pattern secured on said work table for edgewise engagement by the followers on said carriages,
      (1) said pattern having upper and lower levels of edgewise profile contour, and
      (2) said followers being at different elevations relative to the work table for engagement with a respective one of the profile contour levels of said pattern.

10. In a profiling machine, the combination defined in claim 9 wherein the motor driven cutter and spindle assembly comprises a router head slidably mounted in vertical ways on said second carriage, power operated means are provided for raising and lowering the router head automatically in said ways, and means actuated by engagement with said pattern are provided for controlling the operation of said power means.

11. In a profiling machine, the combination defined by claim 10 wherein the pattern is provided with a third level of variable contour adapted to be engaged by the last mentioned means for controlling the operation of said power means.

References Cited by the Examiner

UNITED STATES PATENTS

| 1,839,196 | 1/32 | Cameron | 144—144 |
| 2,314,250 | 3/43 | Smith et al. | 82—14 |

FOREIGN PATENTS

| 328,165 | 4/30 | Great Britain. |
| 662,639 | 8/29 | France. |

WILLIAM W. DYER, Jr., *Primary Examiner.*

DONALD R. SCHRAN, *Examiner.*